(12) United States Patent
Shen et al.

(10) Patent No.: US 7,724,752 B1
(45) Date of Patent: May 25, 2010

(54) COMMUNICATION SYSTEM ACROSS NETWORKS AND METHOD THEREOF

(75) Inventors: Chung Yung Shen, Taipei (TW); Jer Hong Suen, Taipei (TW)

(73) Assignee: Moxa Inc., Taipei (TW)

( * ) Notice: Subject to any disclaimer, the term of this patent is extended or adjusted under 35 U.S.C. 154(b) by 19 days.

(21) Appl. No.: 12/318,364

(22) Filed: Dec. 29, 2008

(51) Int. Cl.
*H04L 12/28* (2006.01)

(52) U.S. Cl. .................. 370/401; 370/389; 370/328

(58) Field of Classification Search .............. None
See application file for complete search history.

(56) References Cited

U.S. PATENT DOCUMENTS

| | | | |
|---|---|---|---|
| 7,031,328 B2 * | 4/2006 | Thubert et al. | 370/401 |
| 7,149,225 B2 * | 12/2006 | Thubert et al. | 370/401 |
| 7,286,537 B2 * | 10/2007 | Roh | 370/392 |
| 7,366,188 B2 * | 4/2008 | Kim | 370/401 |
| 7,369,563 B2 * | 5/2008 | Choi et al. | 370/401 |
| 7,609,678 B2 * | 10/2009 | Sharma et al. | 370/338 |
| 2003/0227930 A1 * | 12/2003 | Choi et al. | 370/401 |
| 2004/0004968 A1 * | 1/2004 | Nassar | 370/401 |
| 2004/0218611 A1 * | 11/2004 | Kim | 370/401 |
| 2006/0126620 A1 * | 6/2006 | Bonar et al. | 370/389 |
| 2007/0211676 A1 * | 9/2007 | Sharma et al. | 370/338 |

\* cited by examiner

*Primary Examiner*—Bob A Phunkulh
(74) *Attorney, Agent, or Firm*—Bacon & Thomas, PLLC (57) ABSTRACT

This specification discloses a communication system across networks and the method thereof for processing remote controls of devices in a private network from a public network. By providing a server end that contains correspondence relations between client ends and mobile ends in a public network, packets in the public network are automatically transmitted to devices in a private network according to the correspondence table in the server end for remote controls. The invention increases the convenience in managing devices in a private network.

10 Claims, 6 Drawing Sheets

COMMUNICATION SYSTEM ACROSS NETWORKS AND METHOD THEREOF

BACKGROUND OF THE INVENTION

1. Field of Invention

The invention relates to a communication system and the method thereof. In particular, the invention relates to a communication system across networks and the corresponding method that can implement remote controls of devices in a private network from the client end of a public network.

2. Related Art

Due to prosperous Internet developments in recent years, networking devices requiring IP addresses also grow rapidly. The IP addresses are unique. Moreover, the widely used IP addresses are in accord with the fourth-generation protocol (IPv4), which only uses 32 bits to locate all networking devices worldwide. Therefore, the IP addresses are insufficient for current uses.

In observation of this, some vendors provide the network address translation (NAT) technique to make full use of the limited amount of IP addresses. Generally speaking, the IP addresses include public IP addresses and private IP addresses. The so-called public IP address is a legal IP address issued by an Internet service provider (ISP), i.e., a physical network address on the Internet (the public network). The private IP address is an IP address that is reserved and not issued, also called a virtual IP address. The reserved IP addresses are for an intranet (the private network). They can be arranged and issued by the network administrator according to needs. For example, the reserved IP address according to IPv4 range from 10.0.0.1 to 10.255.255.254, from 172.16.0.1 to 172.31.255.254, and from 192.168.0.1 to 192.168.255.254. A same private IP address can be used in different private networks. Therefore, this method can effectively solve the problem of insufficient IP addresses. However, since different private networks may have the same private network addresses, packets cannot be freely transferred between private and public networks in order to avoid incorrect addressing. To transmit, packets have to rely on an intermediate end between the private and public networks and supporting IP address translations, such as an IP router.

However, the above-mentioned IP address translation requires a first device in the private network to sends a connection request to a second device in the public network, so that the correspondence relation between IP address of the first device and the second device is recorded in a correspondence table at the intermediate end during the connection request. The correspondence table is then used for packet transfers. Therefore, if the first device does not send a connection request to the second device, it is impossible for the second device in the public network to perform a remote control on the first device in the private network.

In summary, the prior long has the problem that the second device in the public network cannot actively perform remote controls on the first device in the private network. It is therefore highly desirable to provide a solution.

SUMMARY OF THE INVENTION

In view of the foregoing, the invention discloses a communication system across networks and the method thereof.

The disclosed communication system across networks is used in an environment with public and private networks. The system includes: a client end, a mobile end, a network service end, and a server end. The client end is in the public network for transmitting a controlling message. The mobile end is in the private network and includes a preprocessing module and a controlling module. The preprocessing module transmits a connection request. The controlling module receives the controlling message and executes the controlling message to return a data message. The network service end is in the public network and simultaneously connected with the public and private networks. It further has a conversion table recording the correspondence relations between the network identification (ID) codes of the network service end and the mobile end. It then transmits packets according to the conversion table.

The server end is in the public network. When it starts, it initializes a first socket port and a second socket port. The server end further includes: a storing module, a receiving module, a connecting module, and a transferring module. The storing module stores a correspondence table. The correspondence table includes at least the correspondence relation between a client socket port and a converted socket port. The receiving module in the public network receives the controlling message transmitted from the client end via the first socket port, and receives the connection request and data message transmitted from the mobile end via the second socket port. The connecting module establishes a connection between the server end and the mobile end according to the connection request. After the connection is established, the converted socket port is recorded in the correspondence table and a connection between the server end and the client end is established according to the controlling message. After this connection is established, the client socket port is recorded in the correspondence table. The transferring module transfers the controlling message via the second socket port to the mobile end and transfers the data message to the client end via the first socket port according to the correspondence table. The connection between the server end and the mobile end is done via the network service end.

The disclosed communication method across networks is used in an environment with a client end, a mobile end, a network service end, a server end, a public network and a private network. The method includes the steps of: establishing a correspondence table at the server end in the public network, the correspondence table including at least the correspondence relation between a client socket port and a converted socket port; establishing a conversion table at the network service end in the public network and simultaneously connected with the public and private networks, the conversion table recording the correspondence relation between the network ID codes of the network service end and the mobile end, and transmitting packets according to the conversion table; initializing a first socket port and a second socket port when the server starts; transmitting a connection request from the mobile end in the private network to the server end; receiving the connection request transmitted from the mobile end via the second socket port by the server end to establish a connection between the server end and the mobile end and, after the connection is established, recording the converted socket port in the correspondence table; transmitting a controlling message from the client end in the public network to the server end; receiving the controlling message transmitted from the client end by the server end in the public network; establishing the connection between the server end and the client end by the server end according to the controlling message, recording the client socket port in the correspondence table after the connection is established, and transmitting the controlling message to the mobile end via the second socket port according to the correspondence table; receiving the controlling message by the mobile end and executing the controlling message to return a data message to the server end; transmitting the data message via the first socket port from the server end to the client end according to the correspondence table. The connection between the server end and the mobile end is mediated via the network service end.

The system and method of the invention as described above differ from the prior art in that the invention provides a server end in the public network that has the correspondence relations between the client ends and the mobile ends. Packets in the public network are automatically transmitted to devices in the private network according to the correspondence table on the server end for remote controls.

Using the above-mentioned techniques, the invention can facilitate the management of devices in the private network.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Before explaining the disclosed communication system across networks and the method thereof, the structure of the invention is first described as follows. The disclosed system includes a client end, a mobile end, a network service end, and a server end. The client end is a device in the public network (e.g., the so-called Internet), such as a personal computer (PC). The public network is the network environment using public addresses to transmit packets. The mobile end refers to a device (e.g., mobile device) in the private network (e.g., intranet) of an Internet service provider (ISP). The private network is a network environment using private IP addresses to transmit packets. The network service end is a server simultaneously in the public and private networks. It is a network device (e.g., router) of the ISP for providing the service of IP address conversion. It transmits packets in the intranet to the Internet and packets on the Internet to the intranet according to the conversion table. For example, suppose a client in the public network has the IP address '168.95.1.2' and the mobile end in the private network has the IP address '192.168.1.2'. Since the packets from the IP address '192.168.1.2' cannot be directly transmitted to the public network, it is therefore necessary for the network service end to convert IP addresses. That is, the source IP address '192.168.1.2' in the packet is replaced by the IP address '168.95.1.2' for transmissions. Afterwards, the returning packet is transmitted to the mobile end with the IP address of '192.168.1.2'. Since the packet transfer technique of the network service end is well known to the field, it is not further described herein. The server end records the correspondence relations between client socket ports and converted socket ports. The client socket port is the source port of the client end. The converted socket port is the number of the source port of the mobile end converted by the network service end. The server end will be described in more detail later. Besides, the public network and private network can use wired and/or wireless network architectures.

Figure 1:
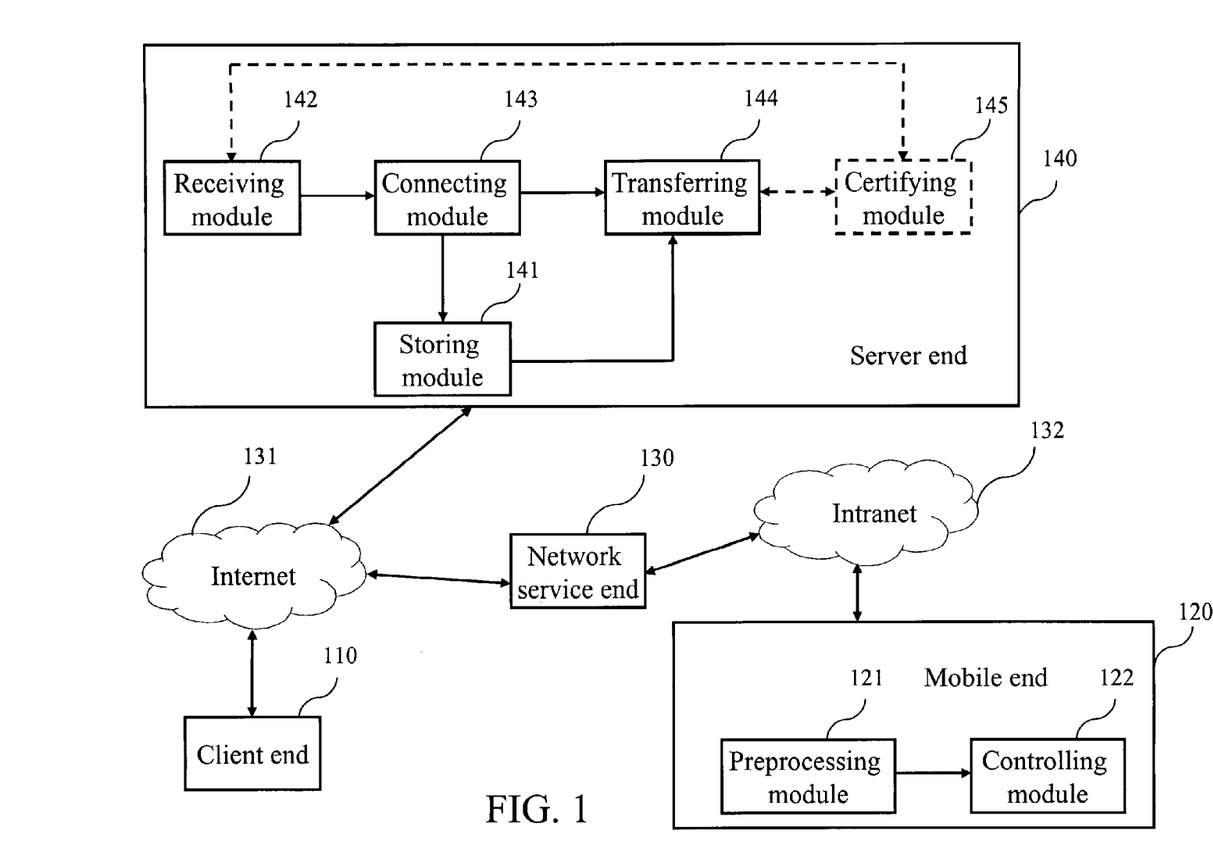
FIG. 1 is a block diagram of the disclosed communication system across networks.

The disclosed communication system across networks and the method thereof are explained in the following paragraphs with reference to accompanying figures. FIG. 1 is a block diagram of the disclosed communication system across networks. The system includes a client end 110, a mobile end 120, a network service end 130, the Internet 131, an intranet 132, and a server end 140. The client end 110 is in the public network (e.g., the Internet 131) for transmitting a controlling message. In practice, the controlling message has to be capsulated into several packets for the convenience of transmissions in the public network. Since the capsulation and corresponding decapsulation of packets belong to the prior art, they are not further described herein.

The mobile end 120 is in the private network (e.g., the intranet 132) and includes: a preprocessing module 121 and a controlling module 122. The preprocessing module 121 transmits a connection request. In practice, the connection request can be the SYN message packet transmitted in the TCP/IP three-way handshake process.

The controlling module 122 receives the controlling message and executes it to return a data message. The controlling message is a command or signal for controlling the mobile end 120. For example, suppose the controlling message is the command of obtaining the connection status. After the mobile end 120 receives the controlling message, the mobile end 120 detects the current connection status (e.g., connection rate) accordingly and returns a data message containing the connection status to the client end 110. It should be noted that the controlling message can be simple data, such as text, picture and audio/video (AV) data.

The network service end 130 is in the public network (i.e., the Internet 131) for simultaneous connections with the public network and the private network (i.e., the intranet 132). It has a conversion table for recording the correspondence relation between the network ID codes of the network service end 130 and the mobile end 120. The packets are then transferred according to the conversion table. The network ID code includes an IP address and a socket port number.

The server end 140 is in the public network. When it starts, it initializes a first socket port and a second socket port that have different numbers in the transmission control protocol. The server end 140 includes: a storing module 141, a receiving module 142, a connecting module 143, and a transferring module 144. The storing module 141 stores the correspondence table that includes at least the correspondence relation between the client socket port and the converted socket port. For example, suppose the source port of the client end 110 is '1234' and the source port of the mobile end 120 is '3148'. The source port '3148' is converted by the network service end 130 into '2761'. This is the converted socket port. The correspondence table includes at least the two socket ports (i.e., the client socket port and the converted socket port). When the server end 140 receives a packet from the client socket port '1234', it is transferred according to the correspondence table to the converted socket port '2761' of the network service end 130. The packet at the converted socket port '2761' of the network service end 130 is further transferred to the source port '3148' of the mobile end 120 according to the correspondence table. This completes the packet transmission. In addition, the correspondence table can further include the correspondence relations of IP addresses. It should be emphasized that the above-mentioned packet transmission process is described for socket ports. During the actual packet transmission process, IP addresses are also required for packet transmissions in addition to the socket ports. Since the conversion of IP addresses belongs to the prior art, it is not further described herein.

After the server end 140 finishes the initialization of the first socket port and the second socket port, the receiving module 142 in the public network receives the controlling message from the client end 110 via the first socket port and receives the connection request and data message from the mobile end 120 via the second socket port. In practice, the receiving module 142 uses a preset first socket port (e.g., the socket port '80') to receive the controlling message transmitted from the client end 110. It also uses a preset second socket port (e.g., the socket port '81') to receive the connection request and data message transmitted from the mobile end 120. It is noted that the connection request and data message transmitted from the mobile end 120 are transmitted via the network service end 130. In other words, the connection between the server end 140 and the mobile end 120 is established via the network service end 130.

The connecting module 143 establishes the connection between the server end 140 and the mobile end 120 according to the connection request. After the connection is established, the converted socket port is recorded in the correspondence table. The connection between the server end 140 and the client end 110 is established according to the controlling message. After this connection is established, the client socket port is recorded in the correspondence table. For example, suppose the connecting module 143 receives a connection request sent from the mobile end 120. Since the connection request is transmitted via the network service end 130, the server end 140 can obtain the IP address, the socket port number (i.e., the converted socket port) and related connection parameters (e.g., network protocol type) of the network service end according to the connection request. It further establishes the connection between the server end 140 and the mobile end 120 via the network service end 130. Likewise, when the connecting module 143 receives the controlling message transmitted from the client end 110, the server end 140 the IP address, the socket port number (i.e., the converted socket port) and related connection parameters (e.g., network protocol type) of the client end 110 according to the controlling message, and uses it to establish the connection between the server end 140 and the client end 110. The related connection parameters include network transmission protocols of TCP, UDP, etc. Besides, the connecting module 143 obtains the converted socket port of the source port of the mobile end 120 according to the connection request packet. After knowing the client socket port of the client end 110 from the controlling message, the above-mentioned converted socket port and client socket port are recorded in the correspondence table of the server end 140.

The transferring module 144 transfers the controlling message via the second socket port to the mobile end 120 according to the correspondence table and transfers the data message via the first socket port to the client end 110. For example, suppose the correspondence table of the server end 140 records that the client socket port of the client end 110 is '1234' and the corresponding converted socket port is '2761'. After the server end 140 receives a packet from the client socket port '1234', it is transferred to the converted socket port '2761' according to the correspondence table. The network service end 130 further transfers the packet to the mobile end 120 according to the converted socket port '2761' and the correspondence relation between the network ID codes of the network service end 130 and the mobile end 120 recorded in the conversion table.

Besides, the server end 140 further includes a certifying module 145 for issuing the mobile end 120 and/or the client end 110 digital certificates. In practice, the certifying module 145 encodes/decodes the controlling message, the connection request, and the data message using the secure socket layer (SSL) along with the digital certificates. In other words, packet transmissions are encrypted to prevent eavesdropping. This greatly increases the security of packet transmissions. Moreover, the certifying module 145 can manage and issue digital certificates. Since the management, issuance, and related techniques of digital certificates belong to the prior art, they are not further described herein.

Figure 2A:
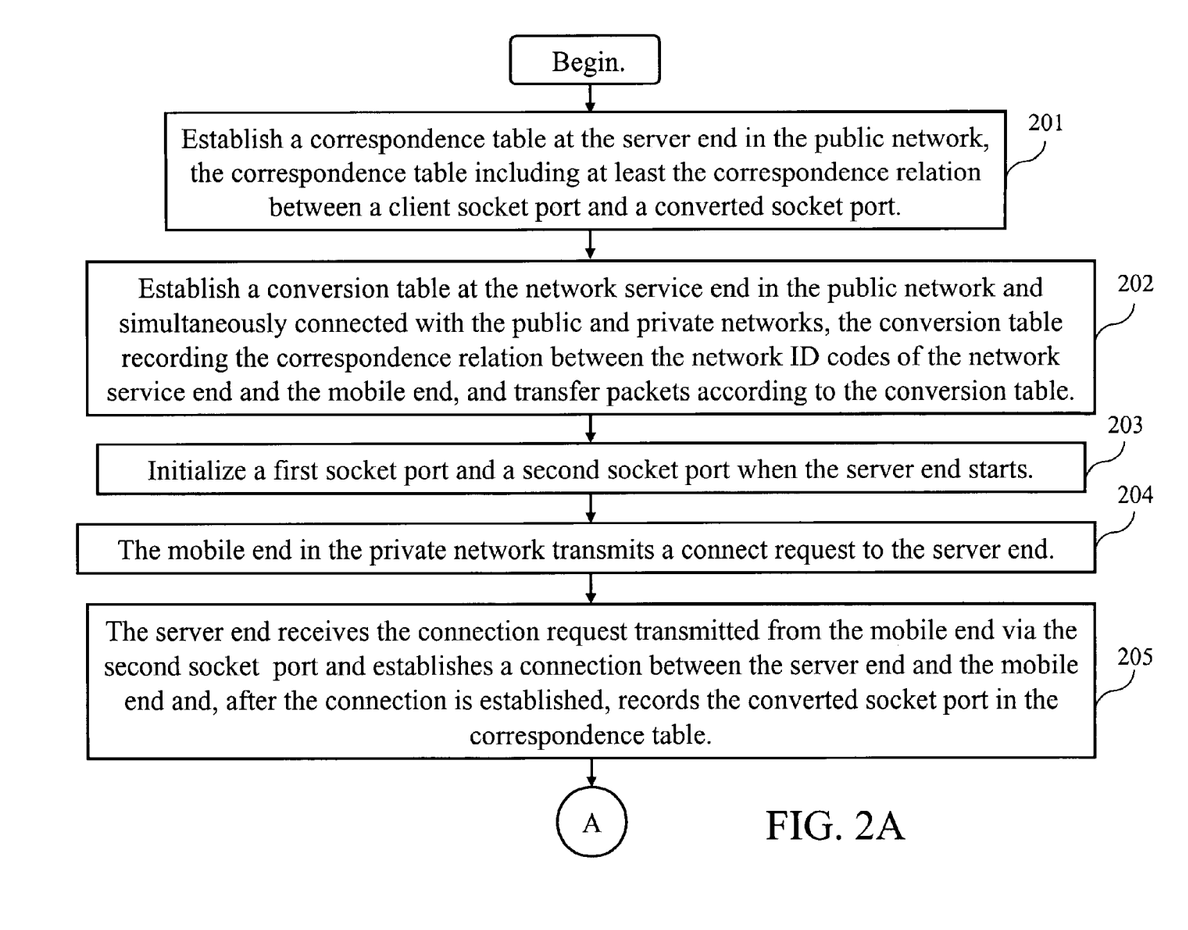
FIG. 2A and FIG. 2B are flowcharts of the disclosed communication method across networks.
Figure 2B:
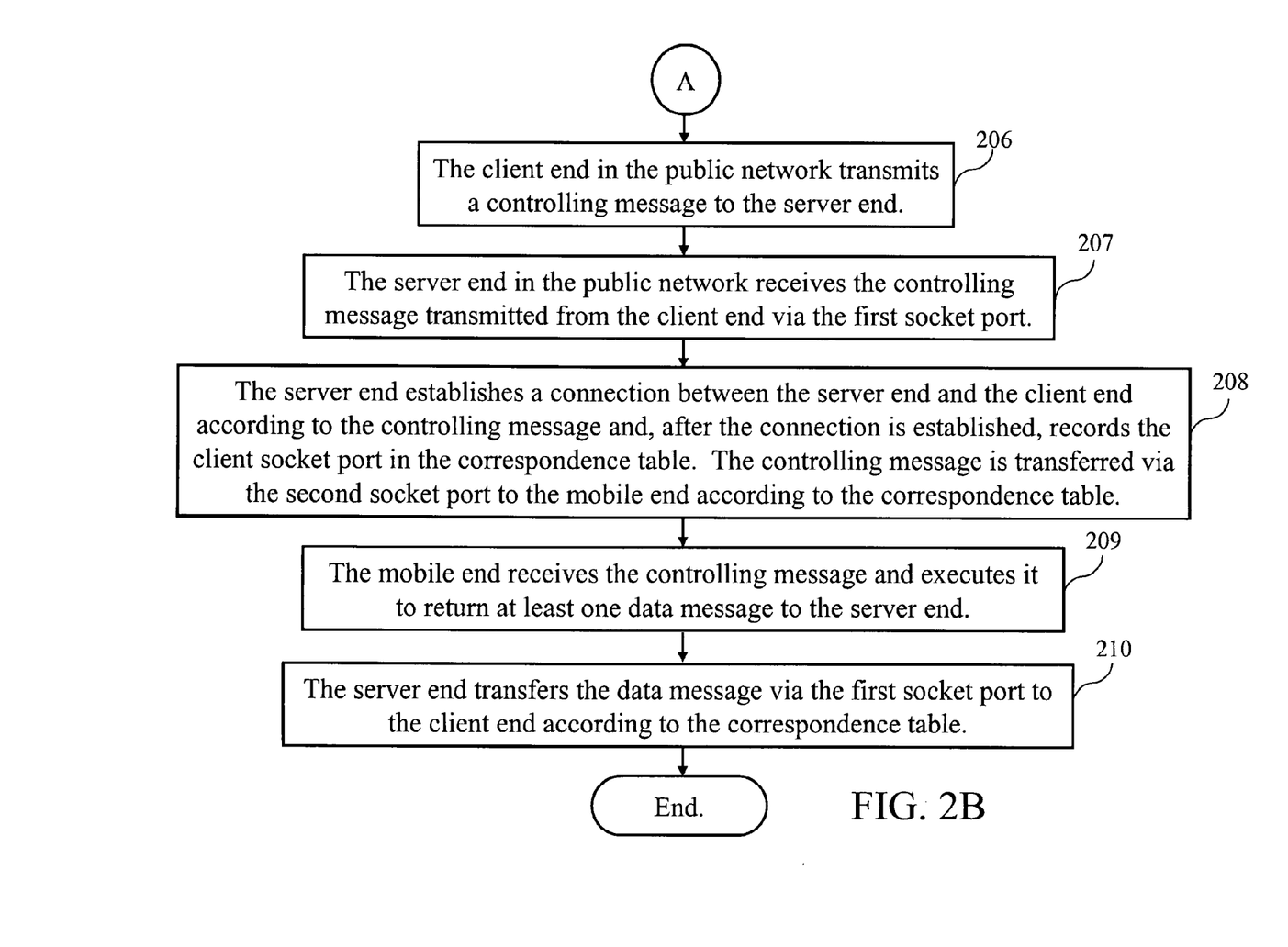

FIG. 2A and FIG. 2B are flowcharts of the disclosed communication method across networks used in a network environment with a client end 110, a mobile end 120, a network service end 130, a server end 140, a public network (i.e., the Internet 131), and a private network (i.e., an intranet 132). The method includes the following steps. In step 201, a correspondence table is established at the server end 140 in the public network. The correspondence table should include at least the correspondence relation between the client socket port and the converted socket port. In step 202, a conversion table is established at the network service end 130 in the public network and simultaneously connected with the public and private networks. The conversion table records the correspondence relation between the network ID codes of the network service end 130 and the mobile end 120, and transfers packets according to the conversion table. When the server end 140 starts, it initializes the first socket port and the second socket port in step 203. In step 204, the mobile end in the private network transmits a connection request to the server end 140. In step 205, the server end 140 establishes the connection between the server end 140 and the mobile end 120 according to the connection request transmitted from the mobile end via the second socket port. After the connection is established, the converted socket port is recorded in the correspondence table. The client end 110 in the public network transmits the controlling message to the server end 140 in step 206. The server end 140 in the public network receives the controlling message transmitted from the client end via the first socket port in step 207. In step 208, the server end 140 establishes the connection between the server end 140 and the client end 110 according to the controlling message. After the connection is established, the client socket port is recorded in the correspondence table. The controlling message is transmitted via the second socket port to the mobile end 120 according to the correspondence table. The mobile end 120 receives the controlling message and executes it to return a data message to the client end 140 in step 209. The server end 140 transfers the data message to the client end 110 via the first socket port in step 210. The connection between the server end 140 and the mobile end 120 is established via the network service end 130. Through the above-mentioned steps, the server end 140 holding the correspondence relation between the client end 110 and the mobile end 120 in the public network (i.e., the correspondence table) can automatically transfer packets in the public network to devices in a private network for remote control. This facilitates the management of devices in the private network.

Figure 3:
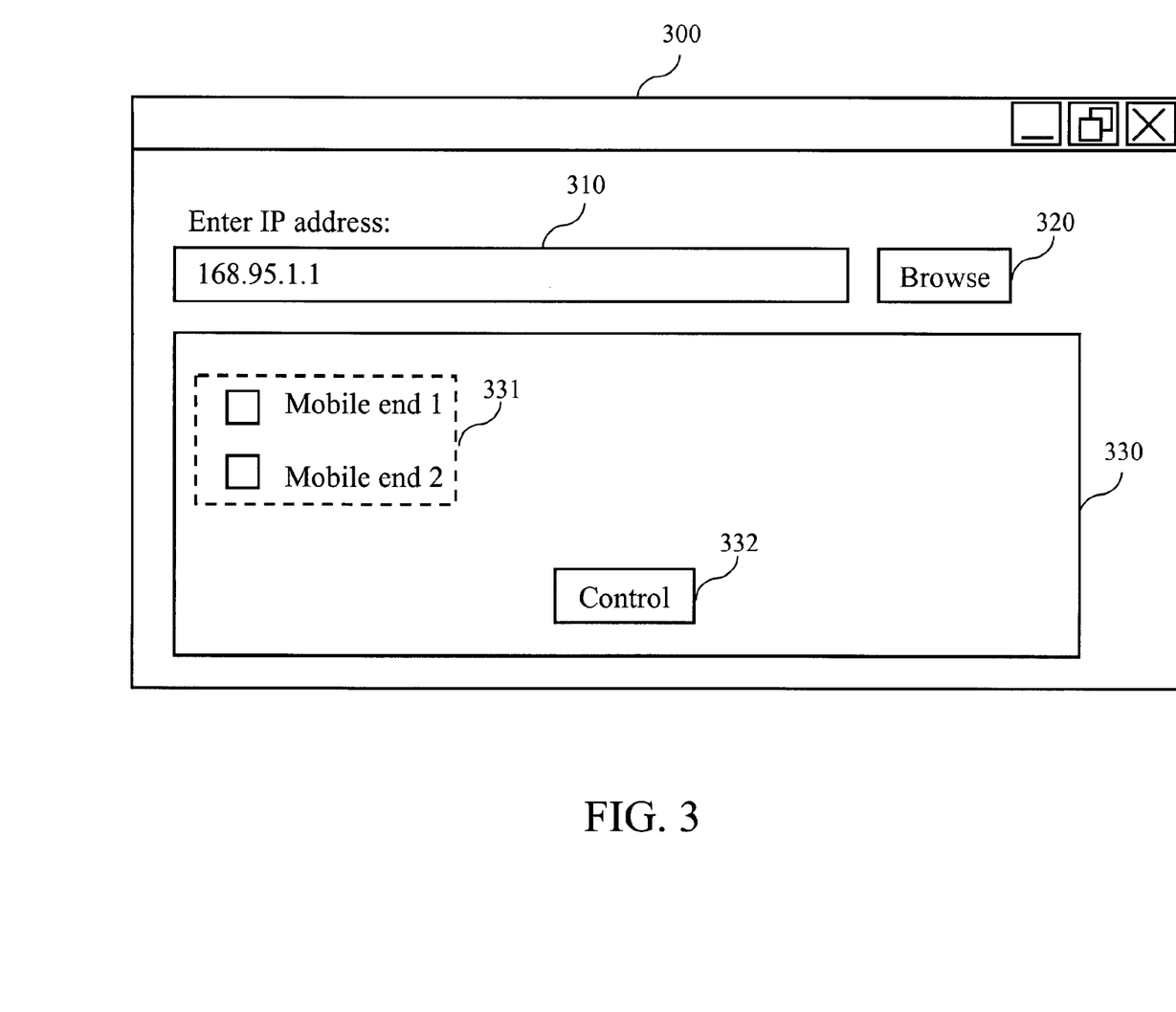
FIG. 3 is a schematic view of the operating interface for the client end to select a mobile end to control according to the invention.
Figure 4:
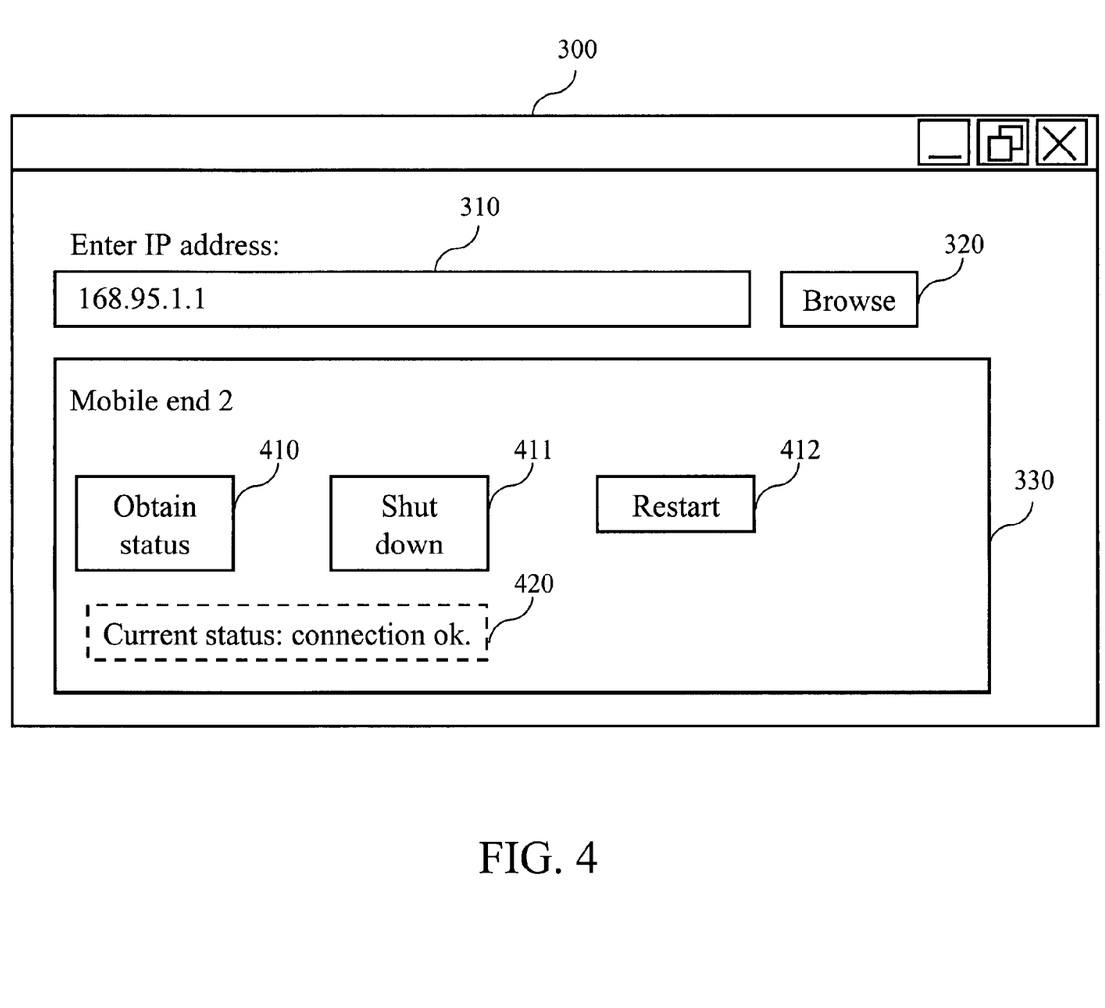
FIG. 4 is a schematic view of controlling the mobile end according to the invention.
Figure 5:
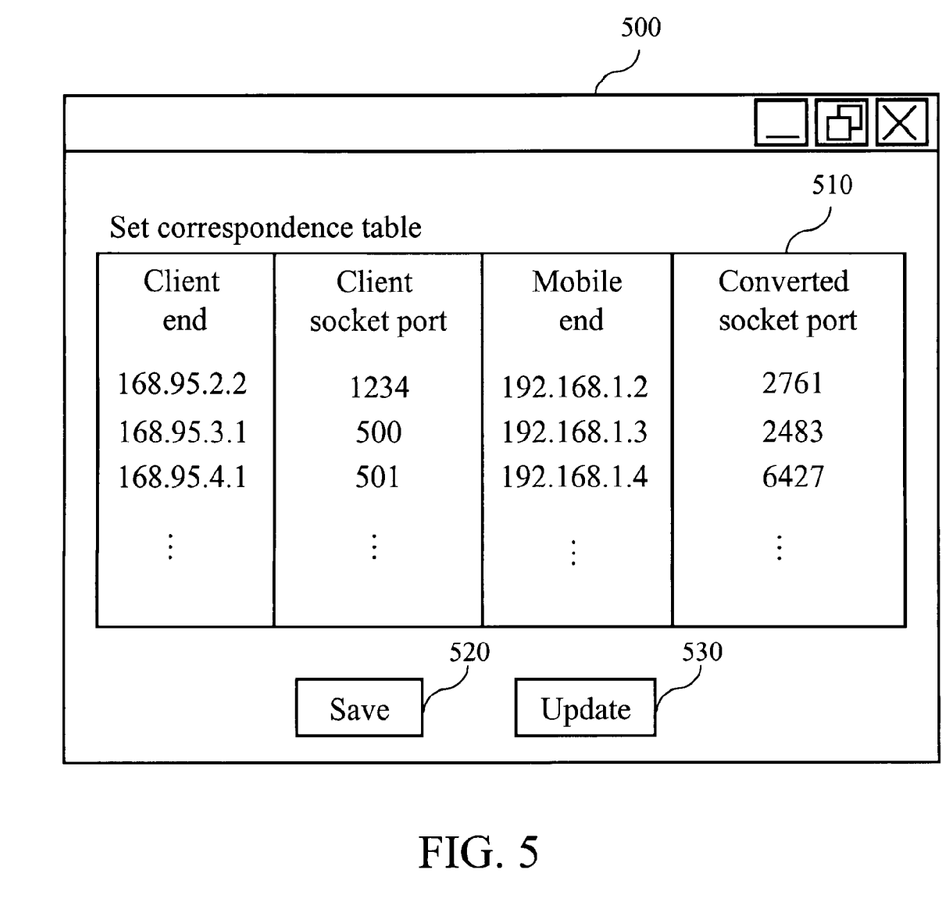
FIG. 5 is a schematic view of setting the correspondence table according to the invention.

The following description of an embodiment of the invention refers to FIGS. 3 to 5. Please simultaneously refer to FIG. 1. FIG. 3 is a schematic view of the operating interface for the client end 110 to select a mobile end 120 to control. It includes: a device browsing window 300, an input field 310, a browsing element 320, a webpage display field 330, a select element 331, and a control element 332. It should be emphasized that the invention does not restrict the type and number of elements contained in the device browsing window 300.

To perform communications across networks according to the invention, the mobile end 120 has to transmit a connection request according to the preset IP address (e.g., '168.95.1.1') of the server end 140 for establishing a connection between the server end 140 and the mobile end 120. It transmits the connection request to the server end 140 via its preprocessing module 121 in the public network (i.e., the intranet 132). During the transmission process to the server end 140, the network service end 130 has to perform IP address and socket port conversions. The correspondence relation between the network ID codes (i.e., the IP addresses and socket ports) of the network service end 130 and the mobile end 120 is recorded in the conversion table for the server end 140 and the mobile end 120 to make a connection. Since the server end 140 has initialized the first and second socket ports when it starts, the original IP address (e.g., '192.168.1.1' of the mobile end 120) and the socket port (e.g., '3148') of the connection request are converted by the network service end 130 into the IP address (e.g., '168.95.1.88') and the converted socket port (e.g., '2761') of the network service end 130. Therefore, the receiving module 142 of the server end 140 in the Internet 131 can receive via the second socket port (e.g., socket port number '81') the connection request transmitted from the mobile end 120 and transferred from the network service end 130.

Afterwards, the connecting module 143 of the server end 140 establishes the connection between the server end 140 and the mobile end 120 according to the received connection request. After the connection, the converted socket port (e.g., with the socket port number '2761') is recorded in the correspondence table. In practice, the records in the correspondence table are mobile ends 120 that have completed the connections. Therefore, the correspondence table can be used to determine the connection status of each mobile end 120 in the intranet 132 (i.e., the private network). In addition, the server end 140 in the public network (i.e., the Internet 131) also receives via the first socket port (e.g., with the socket port number '80') the controlling message transmitted from the client end 110. The controlling message will be detailed later.

As shown in FIG. 3, the user enters the IP address (e.g., '168.95.1.1') of the server end 140 in the input field 310 of the device browsing window 300 and clicks the browsing element 320 to connect to the server end 140. Afterwards, the server end 140 obtains the connection status of the mobile end 120 in the intranet 132 according to the record of the converted socket port in the correspondence table. For example, suppose the correspondence table has the record of a converted socket port '2761'. This means that the mobile end 120 with the converted socket port has connected to the server end 140. In this case, the server end 140 can transmit the connection status of the mobile end 120 to the client end 110 and display it in the webpage display field 330. In practice, as shown in FIG. 3, the user can use the select element 331 to display the connected mobile end 120 in order to select a mobile end 120 to control remotely. After the user uses the select element 331 to make a selection of a mobile end to remotely control (e.g., selecting the 'mobile end 2'), he or she can further click the control element 332 for further operations. In practice, the correspondence table can further record the IP address and web media access address of the mobile end 120 and display them after the description of the select element 331. For example, the text 'mobile end 1' is followed by '192.168.1.1' (not shown) so that the user can more readily identify the mobile end 120.

FIG. 4 is a schematic view of how the invention controls the mobile end. After the user clicks the control element 332, a corresponding webpage is loaded into the webpage display field 330 according to the selection through the select element 331. For example, it loads the webpage containing a status obtaining element 410, a shutdown element 411, and a restart element 412. When the user clicks one of the above-mentioned elements, a corresponding controlling message is generated and transmitted to the server end 140. Moreover, the status of the selected mobile end 120 can even be displayed in the status display field 420 (e.g., displaying 'connection ok' in text). It should be mentioned that in addition to generating and transmitting the corresponding controlling message through the above-mentioned elements, the user can enter words via a text input field (not shown) in practice. The text is contained in the controlling message and sent to the mobile end 120. The mobile end 120 can therefore display the text therein via a display device (e.g., an LCD).

After the client end 110 transmits the controlling message in the public network (e.g., the Internet 131) to the server end 140, the connecting module 143 of the server end 140 establishes the connection between the server end 140 and the client end 110 according to the controlling message received by the receiving module 142. The client socket port (e.g. '1234') of the connected client end 110 is recorded in the correspondence table of the storing module 141. Afterwards, the transferring module 144 transfers the controlling message via the second socket port to the mobile end 120 in the private network (i.e., the intranet 132) according to the correspondence table. After the controlling module 122 of the mobile end 120 receives the controlling message (e.g., the command of obtaining the status), it executes the received controlling message and returns a data message (e.g., the current input/output pin status of the mobile end 120). After the network service end 130 transfers the returned data message to the server end 140 in packets according to the conversion table, the server end 140 further transfers it via the first socket port to the client 110 for display (not shown). This completes the communication between the client end 110 and the mobile end 120 across networks.

FIG. 5 is a schematic view of setting the correspondence table according to the invention. As mentioned before, the correspondence table in the server end 140 includes at least the correspondence relation between the client socket port and the converted socket port. It can further include the correspondence relation of IP addresses, so that the user can more readily identify the mobile end 120 represented by the converted socket port. However, since the IP address of the mobile end 120 is a private address, the server end 140 in the Internet 131 cannot directly obtain it from the packet header. In practice, the data field of the connection request packet can store at least one of the IP address and media access control address of the mobile end 120. After the server end 140 receives the connection request, the IP address and media access control address can be obtained from the data field. The correspondence table can also be set through the correspondence table setting field 510 of the setting window 500. After completing the settings, the user can click a storing element 520 to save them. Moreover, since the records in the correspondence table change according to the connection conditions, the user can load the current correspondence table at the server end 140 by clicking an updating element 530.

In summary, the invention differs from the prior art in that the public network is provided with the server end 140 holding the correspondence relation between the client end 110 and the mobile end 120. Using the correspondence table of the server end 140 packets in the public network is automatically transferred to a device (i.e., the mobile end 120) in the private network for remote control. This technique enables communications across networks and solves the problem existing in the prior art. It facilitates the management of devices in a private network.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A communication system across networks used in an environment with a public network and a private network, the system comprising:
   a client end, which is in the public network for transmitting a controlling message;
   a mobile end, which is in the private network and includes:
      a preprocessing module for transmitting a connection request; and
      a controlling module for receiving the controlling message and executing it to return at least one data message;
   a network service end, which is in the public network and simultaneously connected with the public and private networks, has a conversion table to record the correspondence relation between network identification (ID) codes of the network service end and the mobile end, and transfers packets according to the conversion table; and
   a server end, which is in the public network, initializes a first socket port and a second socket port when it starts, and includes:
      a storing module, which stores a correspondence table containing at least the correspondence between a client socket port and a converted socket port;
      a receiving module, which in the public network receives the controlling message transmitted from the client end via the first socket port and receives the connection request and the data message transmitted from the mobile end via the second socket port;
      a connecting module, which establishes a connection between the server end and the mobile end according to the connection request and, after the connection is established, records the converted socket port in the correspondence table, and establishes a connection between the server end and the client end according to the controlling message and, after the connection is established, records the client socket port in the correspondence table; and
      a transferring module, which transfers the controlling message via the second socket port to the mobile end according to the correspondence table and transfers the data message via the first socket port to the client end;
   wherein the connection between the server end and the mobile end is achieved via the network service end.

2. The communication system across network of claim 1, wherein the first socket port and the second socket port are different socket port numbers in the transmission control protocol.

3. The communication system across network of claim 1, wherein the correspondence table further includes the correspondence relation of the socket ports.

4. The communication system across network of claim 1, wherein the server end further includes a certifying module for issuing a digital certificate to the mobile end and/or the client end.

5. The communication system across network of claim 1, wherein the first socket port and the second socket port encode/decode the controlling message, the connection request, and the data message through the secure socket layer (SSL).

6. A communication method across networks used in an environment with a client end, a mobile end, a network service end, a server end, a public network, and a private network, the method comprising the steps of:
   establishing a correspondence table at the server end in the public network, the correspondence table including at least the correspondence relation between a client socket port and a converted socket port;
   establishing a conversion table at a network service end in the public network and simultaneously connected with the public and private networks, the conversion table recording the correspondence relation between network ID codes of the network service end and the mobile end, and transferring packets according to the conversion table;
   initializing a first socket port and a second socket port when the server starts;
   transmitting a connection from the mobile end in the private network to the server end;
   establishing a connection between the server end and the mobile end by the server end according to the connection request transmitted via the second socket port by the mobile end and, after the connection is established, recording the converted socket port in the correspondence table;
   transmitting a controlling message from the client end in the public network to the server end;
   receiving the controlling message transmitted from the client end via the first socket port by the server end in the public network;
   establishing a connection between the server end and the client end according to the controlling message by the server end and, after the connection is established, recording the client socket port in the correspondence table, and transferring the controlling message via the second socket port to the mobile end according to the correspondence table;
   receiving the controlling message by the mobile end and executing the controlling message to return at least one data message to the server end; and
   transferring the data message via the first socket port from the server end to the client end according to the correspondence table;
   wherein the connection between the server end and the mobile end is achieved via the network service end.

7. The communication method across network of claim 6, wherein the first socket port and the second socket port are different socket port numbers in the transmission control protocol.

8. The communication method across network of claim 6, wherein the correspondence table further includes the correspondence relation of the socket ports.

9. The communication method across network of claim 6, wherein the server end further executes the step of issuing a digital certificate to the mobile end and/or the client end.

10. The communication method across network of claim 6, wherein the first socket port and the second socket port encode/decode the controlling message, the connection request, and the data message through SSL.

* * * * *